(12) United States Patent
Azam et al.

(10) Patent No.: US 11,873,046 B2
(45) Date of Patent: Jan. 16, 2024

(54) ELECTRICAL METHOD FOR CENTERING TELEHANDLER REAR WHEELS

(71) Applicants: ZOOMLION Heavy Industry NA, Inc., Yorkville, WI (US); ZOOMLION Heavy Industry Science and Technology Co., Ltd., Changsha (CN)

(72) Inventors: Mir H. Azam, Mount Pleasant, WI (US); Javad Saberi Shakib, Greenfield, WI (US); Guy A. Moore, West Allis, WI (US); Calvin Tyler, Yorkville, WI (US)

(73) Assignees: ZOOMLION HEAVY INDUSTRY NA, INC., Yorkville, WI (US); ZOOMLION HEAVY INDUSTRY SCIENCE AND TECHNOLOGY CO., LTD., Changsha (CN)

( * ) Notice: Subject to any disclaimer, the term of this patent is extended or adjusted under 35 U.S.C. 154(b) by 414 days.

(21) Appl. No.: 17/313,286

(22) Filed: May 6, 2021

(65) Prior Publication Data
US 2022/0355859 A1 Nov. 10, 2022

(51) Int. Cl.
*B62D 7/15* (2006.01)
*B62D 7/14* (2006.01)
*B66F 9/075* (2006.01)
*B66F 9/065* (2006.01)

(52) U.S. Cl.
CPC .......... *B62D 7/1572* (2013.01); *B62D 7/142* (2013.01); *B62D 7/1509* (2013.01); *B66F 9/0655* (2013.01); *B66F 9/0755* (2013.01); *B66F 9/07568* (2013.01)

(58) Field of Classification Search
USPC ....... 180/408, 410, 411, 414, 418, 419, 420, 180/421
See application file for complete search history.

(56) References Cited

U.S. PATENT DOCUMENTS

| | | | |
|---|---|---|---|
| 5,758,740 A | 6/1998 | Park | |
| 7,073,620 B2 | 7/2006 | Braun et al. | |
| 7,316,288 B1 | 1/2008 | Bennett et al. | |
| 7,401,677 B2 | 7/2008 | Boyle et al. | |
| 2005/0067212 A1* | 3/2005 | Toyooka | B62D 7/1509 180/410 |
| 2015/0217803 A1* | 8/2015 | Sudale | E02F 9/2087 701/41 |

* cited by examiner

*Primary Examiner* — Hunter B Lonsberry
*Assistant Examiner* — Paysun Wu
(74) *Attorney, Agent, or Firm* — Donald J. Ersler

(57) ABSTRACT

An electrical method for centering telehandler rear wheels preferably includes an electronic control module (ECM), a rear steering cylinder, a pair of rear centering valves, a front steering cylinder, a steer mode valve, at least one steering position sensor, a steering control unit and a mode selection switch. The front and rear steering cylinders are connected to the steer mode valve. The steering control unit directs hydraulic fluid from a hydraulic pump to flow into the front and rear steering cylinders to turn the wheels. A 2W steering mode requires that the rear wheels be straight before going from a 4W steering mode into the 2W steering mode. The ECM monitors a position of the rear wheels through the at least one steering position sensor. If the wheels are not straight, the ECM will open a centering valve to straighten the rear wheels, before going into the 2W steering mode.

15 Claims, 3 Drawing Sheets

ELECTRICAL METHOD FOR CENTERING TELEHANDLER REAR WHEELS

BACKGROUND OF THE INVENTION

1. Field of the Invention

The present invention relates generally to heavy equipment and more specifically to an electrical method for centering telehandler rear wheels, which reduces the challenge of transitioning from four wheel mode to a two wheel steering mode.

2. Discussion of the Prior Art

Job site maneuverability is an important feature of telescopic telehandlers. The telehandlers have three different steering modes of two-wheel front steering only, four-wheel circle steering; and four-wheel crab steering. Transition from 4W steering mode to 2W steering mode may be challenging and might create a safety issue due to a lack of proper centering of the rear wheels. It appears that the prior art does not disclose sensing an angle of the rear wheels and aligning them at a beginning of a transition from a 4W steering mode to a 2W steering mode. The alignment of the rear wheels makes handling of the telehandler much safer and more user friendly. U.S. Pat. No. 5,758,740 to Park discloses an automatic rear wheel self-centering device for four wheel steering vehicles. Park teaches a hydraulic device, which will self-center the rear wheels when the steering mode is changed. Applicants are disclosing an electronic solution to the steering mode transition problem rather than a hydraulic solution disclosed in Park. Applicants' invention will reduce the number of additional hydraulic devices for the telehandler at no additional cost.

U.S. Pat. No. 7,073,620 to Braun et al. discloses a vehicle steering system having a rear steering control mechanism. U.S. Pat. No. 7,316,288 to Bennett et al. discloses an all-terrain vehicle with multiple steering modes. U.S. Pat. No. 7,401,677 to Boyle et al. discloses a self-centering steering system.

Accordingly, there is a clearly felt need in the art for an electrical method for centering telehandler rear wheels, which discloses sensing an angle of the rear wheels and aligning them to be straight before transition from a four wheel steering mode to a two wheel steering mode.

SUMMARY OF THE INVENTION

The present invention provides an electrical method for centering telehandler rear wheels, which reduces the challenge of transitioning from a four wheel steering mode to a two wheel steering mode. A telehandler steering system includes two front and two rear independently steerable wheels. The electrical method for centering telehandler rear wheels (rear wheel centering method) preferably includes an electronic control module (ECM), a rear steering cylinder, a pair of rear centering valves, a front steering cylinder, a steer mode valve, at least one steering position sensor, a steering control unit and a mode selection switch. The steer mode valve is preferably a hydraulic four way, four position valve. The front steering cylinder is connected to the steer mode valve. The rear steering cylinder is also connected to the steer mode valve. The steering control unit directs hydraulic fluid from a hydraulic pump to either flow into a left chamber or a right chamber of at least one of the front steering cylinder and the rear steering cylinder to turn the wheels right or left.

The first flow position of the steer mode valve provides hydraulic fluid flow to make the front steering cylinder steer in an opposite direction of the rear steering cylinder to provide four wheel circle steering. The second flow position of the steer mode valve provides a connection to the front steering cylinder and the steering control unit. The third flow position of the steer mode valve allows the rear steering cylinder to be centered by left and right rear centering valves. The fourth flow position of the steer mode valve provides hydraulic fluid flow to make the front steering cylinder steer in the same direction as the rear steering cylinder to provide four wheel crab steering.

However, the rear wheel centering method requires that the rear wheels be straight, before the operator is allowed to steer with only the front wheels or 2W mode. In order to go from either circle four wheel steering or crab four wheel steering to two wheel front steering, the rear wheels must be perpendicular to a lengthwise axis of rear steering cylinder. Further, the telehandler must also be moving, such that the wheels of telehandler are rotating to change from a four wheel steering mode to the two wheel steering mode. The ECM receives input from the mode selection switch to go from either crab or circle four wheel steering to two wheel steering. The ECM receives input from the at least one steering angle sensor. The ECM will open either a left centering valve or a right centering valve to flow hydraulic fluid into the rear steering cylinder, depending upon which port of the rear steering cylinder needs hydraulic fluid to straighten the rear wheels. If the telehandler is not moving, an alert will be sent to an operator display instructing the operator to put the telehandler in motion and/or an indication light will flash instructing the operator to put the telehandler in motion. The ECM will know that the rear wheels have been straightened by feedback from the at least one steering position sensor. Finally, the ECM shuttles the steer mode valve from the intermediate position to the two wheel steer position.

Accordingly, it is an object of the present invention to provide an electrical method for centering telehandler rear wheels, which discloses sensing an angle of the rear wheels; placing the steer mode valve in an intermediate position; aligning the rear wheels to be perpendicular to the lengthwise axis of the rear steering cylinder at a beginning of a transition to a two wheel steering mode.

These and additional objects, advantages, features and benefits of the present invention will become apparent from the following specification.

DETAILED DESCRIPTION OF THE PREFERRED EMBODIMENTS

Figure 1:
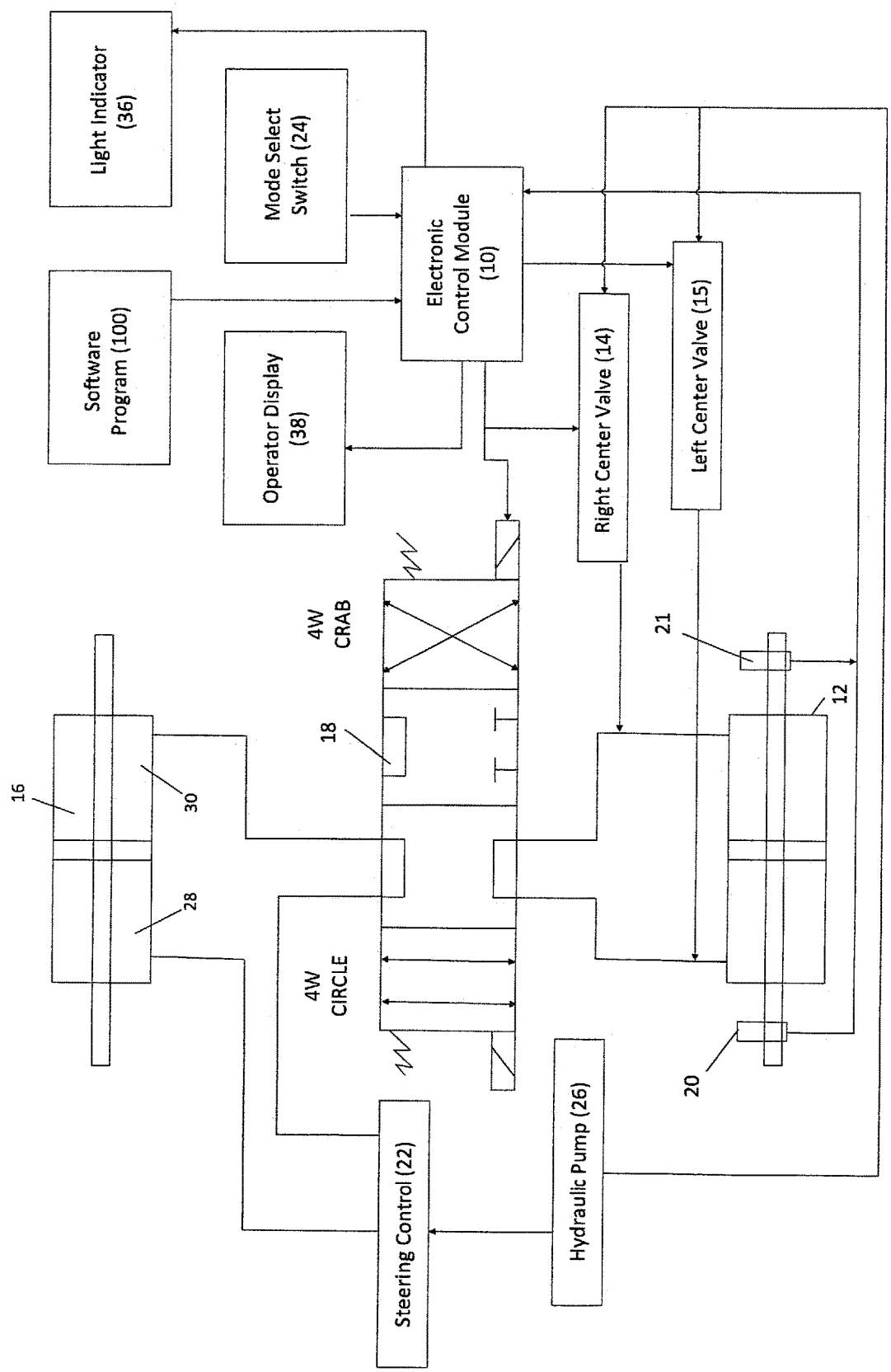
FIG. 1 is a schematic diagram of a rear wheel centering method in accordance with the present invention.

With reference now to the drawings, and particularly to FIG. 1, there is shown a schematic diagram of a rear wheel steering method 1. The rear wheel centering method 1 preferably includes an electronic control module 10, a rear steering cylinder 12, a pair of rear centering valves 14, 15, a front steering cylinder 16, a steer mode valve 18, at least one steering position sensor 20, 21, a steering control unit 22 and a mode selection switch 24. The steer mode valve 18 is preferably a hydraulic four way, four position valve. The front steering cylinder 16 is connected hydraulically to the steer mode valve 18. The rear steering cylinder 12 is also hydraulically connected to the steer mode valve 18. The steering control unit 22 directs hydraulic fluid from a hydraulic pump 26 to either flow into a left chamber 28 or a right chamber 30 of at least one of the front steering cylinder 16 and rear steering cylinder 12 to turn the wheels right or left. A steering mechanism utilizing a double ended hydraulic cylinder is shown in U.S. Pat. No. 5,758,740 to Park and is hereby incorporated by reference in its entirety.

The first flow position of the steer mode valve 18 provides hydraulic fluid flow to make the front steering cylinder 16 steer in an opposite direction of the rear steering cylinder 12 to provide four wheel circle steering. The second flow position of the steer mode valve 18 provides hydraulic flow only between the front steering cylinder 16 and the steering control unit 22 for front two wheel steering. The third flow position of the steer mode valve 18 allows the rear steering cylinder 12 to be centered by left and right rear centering valves 14, 15. Hydraulic fluid does not flow to the front steering cylinder 16. The fourth flow position of the steer mode valve 18 provides hydraulic fluid flow to make the front steering cylinder steer 16 move front wheels in the same direction as rear wheels of the rear steering cylinder 12 to provide four wheel crab steering.

Figure 2:
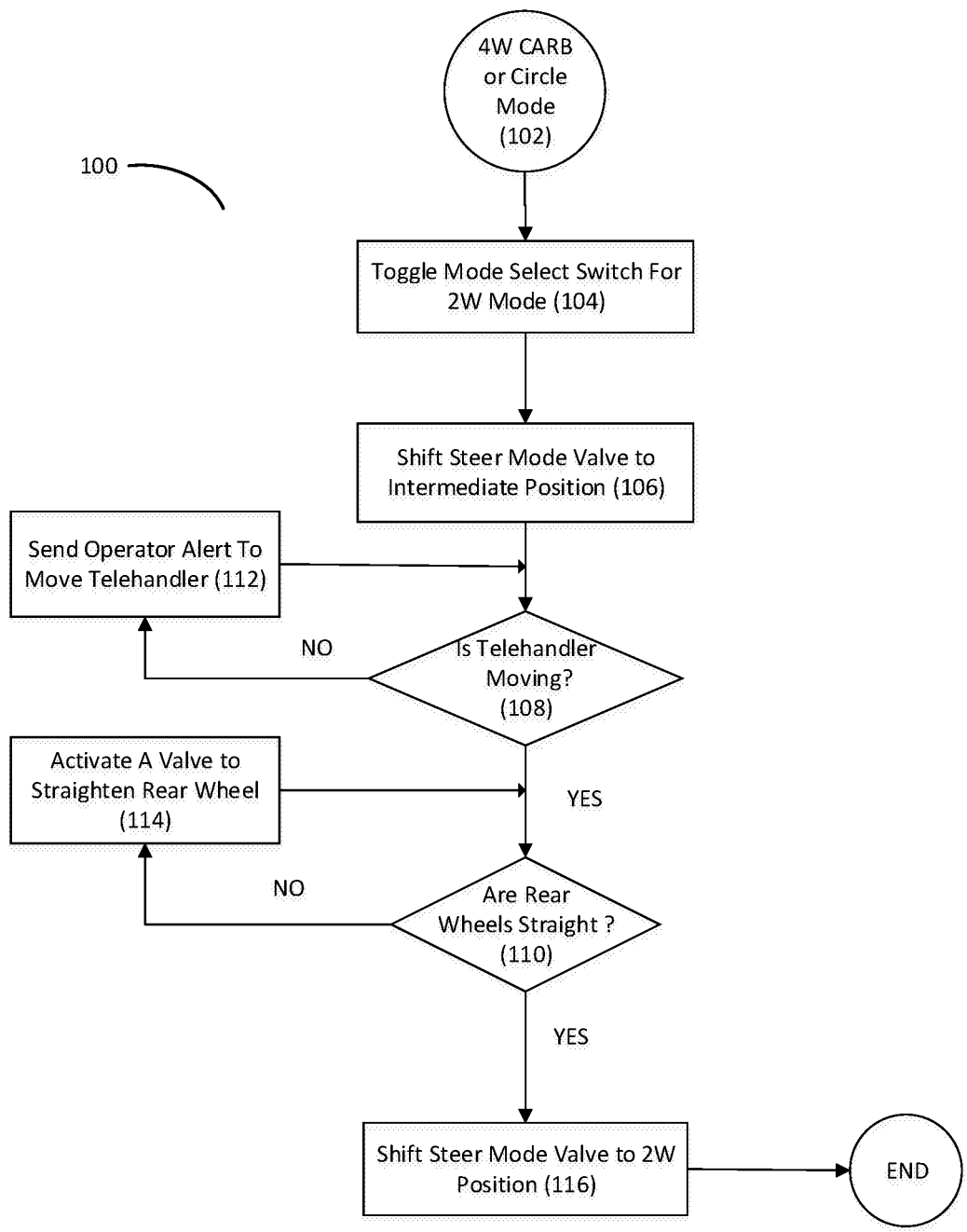
FIG. 2 is a flow chart of selecting two wheel steer mode when in four wheel circle or four wheel crab mode of a rear wheel centering method in accordance with the present invention.
Figure 3:
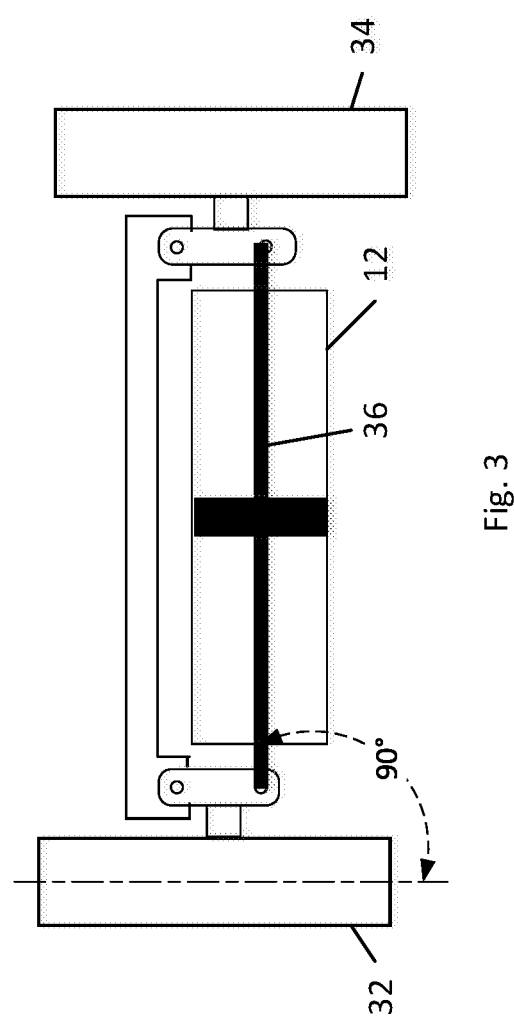
FIG. 3 is a top view of a rear steering mechanism of a rear wheel centering method in accordance with the present invention.

With reference to FIG. 3, the rear wheel centering method 1 requires that the rear wheels 32, 34 be straight, before the operator is allow to steer with only the front wheels. In order to go from either circle four wheel steering or crab four wheel steering to two wheel front steering, the rear wheels 32, 34 must be perpendicular to a lengthwise axis 36 of the rear steering cylinder 12. The telehandler must be moving, such that the wheels of telehandler are rotating to change from a four wheel steering mode to the two wheel steering mode. With reference to FIGS. 1-2, a computer program 100 in the ECM 10 preferably as the following program flow. The steer mode valve 18 is either in 4W crab mode or 4W circle mode in start circle 102. The ECM 10 receives input from the mode selection switch 24 to go from either crab four wheel steering or circle four wheel steering to two wheel steering in process block 104. The ECM 10 shifts the steer mode valve 18 into the intermediate position in process block 106. The ECM 10 will check to see if the telehandler is moving in decision block 108. If telehandler is moving, proceed to decision block 110. If not, the ECM 10 will send an operator alert to move the telehandler through at least one of a flashing indicator light 36 or an operator display screen 38 in process block 112. The ECM 10 receives input from the left steering angle sensor 20 and the right steering angle sensor 21 to see if the rear wheels are straight in decision block 110. If the rear wheels are straight proceed. If not, the ECM 10 will open either a left centering valve 32 or a right centering valve 34 to flow hydraulic fluid from the hydraulic pump 26 into the rear steering cylinder 12, depending upon which port of the rear steering cylinder 12 needs hydraulic fluid to straighten the rear wheels in process block 114. The ECM 10 will know that the rear wheels have been straightened by feedback from the left and right steering position sensors 20, 21. Finally, the ECM 10 shuttles the steer mode valve 18 from the intermediate position to the two wheel steer position in process block 116.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An electrical method for centering telehandler rear wheels, the telehandler including a front steering cylinder, a rear steering cylinder and a steering control unit, the steering control unit is connected to a hydraulic pump, comprising the steps of:
  providing a steer mode valve having a 4W crab position, a 4W circle position, a 2W position and an intermediate position;
  connecting said front steering rear cylinder and said rear steering cylinder to said steer mode valve;
  providing an electronic control module that receives input from said at least one rear wheel sensor;
  shifting said steer mode valve from either said 4W crab position or said 4W circle position into said intermediate position with said electronic control module;
  detecting an angular position of rear wheels connected to the rear steering cylinder;
  straightening the rear wheels by supplying hydraulic fluid to the rear steering cylinder; and
  shifting said steer mode valve to said 2W position with said electronic control module.

2. The electrical method for centering telehandler rear wheels of claim 1, further comprising:
  a right centering valve and a left centering valve for supplying the hydraulic fluid for straightening the rear wheels connected to the rear steering cylinder.

3. The electrical method for centering telehandler rear wheels of claim 2, further comprising:
  a hydraulic pump is connected to the steering control unit, said right centering valve and said left centering valve.

4. The electrical method for centering telehandler rear wheels of claim 1, further comprising:
  a software program is contained in said electronic control module, said software program monitoring said at least one rear wheel sensor.

5. The electrical method for centering telehandler rear wheels of claim 1 wherein:
  the steering control unit is connected to the front steering cylinder, the steering control unit is coupled to the rear steering cylinder through said steer mode valve.

6. An electrical method for centering telehandler rear wheels, the telehandler including a front steering cylinder, a rear steering cylinder and a steering control unit, the steering control unit is connected to a hydraulic pump, comprising the steps of:
  providing a steer mode valve having a 4W crab position, a 4W circle position, a 2W position and an intermediate position;
  connecting said front steering rear cylinder and said rear steering cylinder to said steer mode valve;
  providing an electronic control module that receives input from said at least one rear wheel sensor;
  shifting said steer mode valve from either said 4W crab position or said 4W circle position into said intermediate position with said electronic control module;
  detecting an angular position of rear wheels connected to the rear steering cylinder;

straightening the rear wheels by supplying hydraulic fluid to rear steering cylinder;

requiring the telehandler to be moving before shifting into said 2W position; and shifting said steer mode valve to said 2W position with said electronic control module.

7. The electrical method for centering telehandler rear wheels of claim 6, further comprising:

a right centering valve and a left centering valve for supplying the hydraulic fluid for straightening the rear wheels connected to the rear steering cylinder.

8. The electrical method for centering telehandler rear wheels of claim 7, further comprising:

a hydraulic pump is connected to the steering control unit, said right centering valve and said left centering valve.

9. The electrical method for centering telehandler rear wheels of claim 6, further comprising:

a software program is contained in said electronic control module, said software program monitoring said at least one rear wheel sensor.

10. The electrical method for centering telehandler rear wheels of claim 6 wherein:

the steering control unit is connected to the front steering cylinder, the steering control unit is coupled to the rear steering cylinder through said steer mode valve.

11. An electrical method for centering telehandler rear wheels, the telehandler including a front steering cylinder, a rear steering cylinder and a steering control unit, the steering control unit is connected to a hydraulic pump, comprising the steps of:

providing a steer mode valve having a 4W crab position, a 4W circle position, a 2W position and an intermediate position;

connecting said front steering rear cylinder and said rear steering cylinder to said steer mode valve;

providing an electronic control module that receives input from said at least one rear wheel sensor;

shifting said steer mode valve from either said 4W crab position or said 4W circle position into said intermediate position with said electronic control module;

detecting an angular position of the rear wheels connected to the rear steering cylinder with at least one steering position sensor;

straightening the rear wheels by supplying hydraulic fluid to the rear steering cylinder; and shifting said steer mode valve to said 2W position with said electronic control module.

12. The electrical method for centering telehandler rear wheels of claim 11, further comprising:

a right centering valve and a left centering valve for supplying the hydraulic fluid for straightening the rear wheels connected to the rear steering cylinder.

13. The electrical method for centering telehandler rear wheels of claim 12, further comprising:

a hydraulic pump is connected to the steering control unit, said right centering valve and said left centering valve.

14. The electrical method for centering telehandler rear wheels of claim 11, further comprising:

a software program is contained in said electronic control module, said software program monitoring said at least one rear wheel sensor.

15. The electrical method for centering telehandler rear wheels of claim 11 wherein:

the steering control unit is connected to the front steering cylinder, the steering control unit is coupled to the rear steering cylinder through said steer mode valve.

\* \* \* \* \*